Nov. 3, 1953      P. E. ALLEN      2,657,877
THREAD TENSIONING ATTACHMENT FOR FLY TYING VISES
Filed July 24, 1950
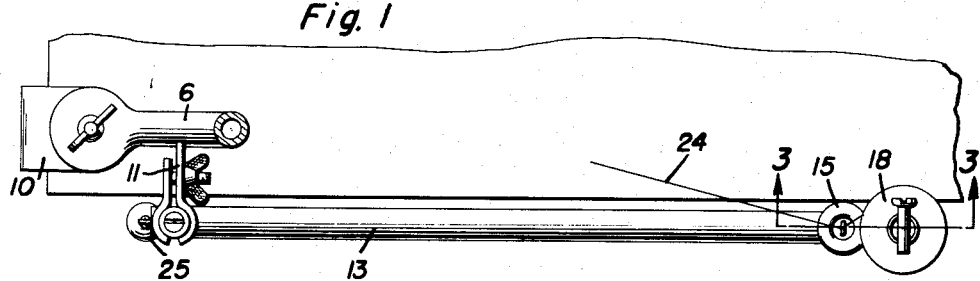
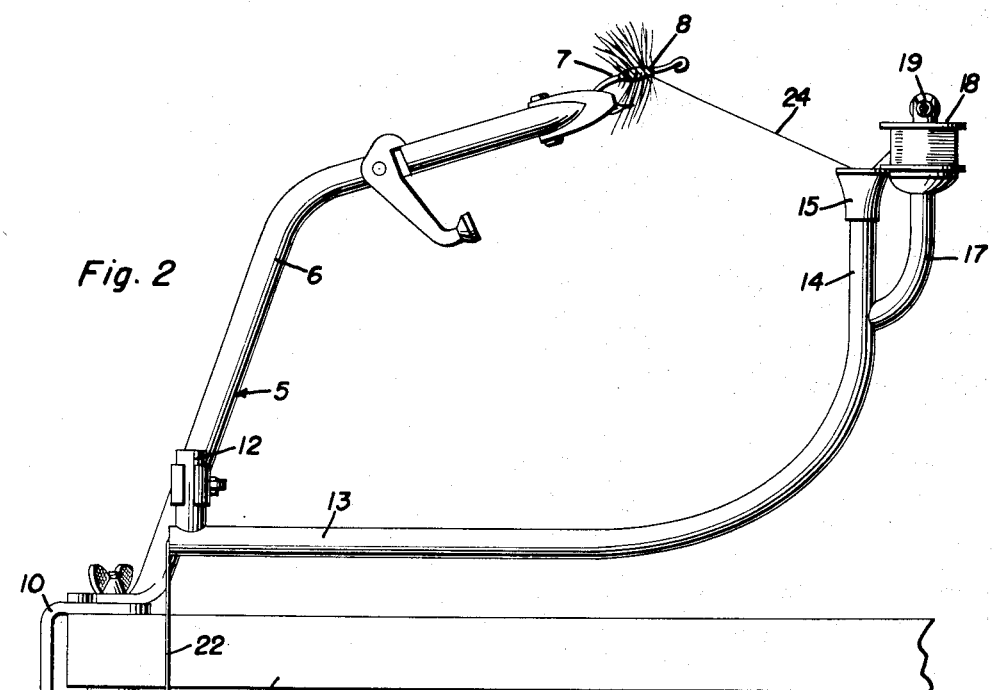
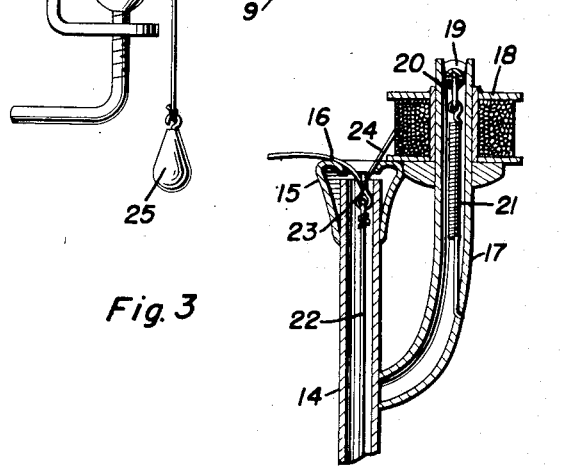
Perry E. Allen
INVENTOR.

Patented Nov. 3, 1953

2,657,877

UNITED STATES PATENT OFFICE 2,657,877

THREAD TENSIONING ATTACHMENT FOR FLY TYING VISES

Perry E. Allen, Durango, Colo.

Application July 24, 1950, Serial No. 175,557

1 Claim. (Cl. 242—149)

The present invention relates to new and useful improvement in devices for tying threads on fishing flies and more particularly to tensioning means for the threads.

More specifically, the invention comprises a weighted guide through which the thread passes, to maintain a uniform tension on the thread and to hold the same taut while tying a fishing fly.

A further object is to provide a device of this character of simple and practical construction, which is efficient and reliable in use, relatively inexpensive to manufacture, and otherwise well adapted for the purposes for which the same is intended.

Other object and advantages reside in the details of construction and operation as more fully hereinafter described and claimed, reference being had to the accompanying drawings forming part hereof, wherein like numerals refer to like parts throughout, and in which:

Figure 1 is a top plan view with parts broken away and shown in section;

Figure 2 is a side elevational view;

Figure 3 is an enlarged sectional view taken on the line 3—3 of Figure 1; and

Figure 4 is a similar view showing the locking pin for the spool of thread in released position.

Referring now to the drawing in detail, wherein, for the purpose of illustration, I have disclosed a preferred embodiment of the invention, the numeral 5 designates generally a fly tying vise of a conventional type and including an upwardly inclined arm 6 in which the bill portion 7 of a fishing fly 8 is clamped, the arm 6 being secured to a work bench or other supporting structure 9 by a C-type clamp 10.

A bracket 11 projects horizontally from the lower portion of arm 6 and in which a post 12 is clamped, the post rising from the rear lower end of a tubular arm 13 having an upwardly curved end 14 positioned adjacent the fishing fly 8. A funnel-shaped thread protector 15 is secured to the upper end of arm 14 and is formed with a rounded upper edge 16.

A tubular spool support 17 is suitably secured at one end to the upstanding end 14 of arm 13, the spool support 17 rising above the upper end of arm 13 and on which a spool of thread 18 is rotatably supported with its lower edge on a horizontal plane with the rounded upper edge 16 of the thread protector 15.

A locking pin 19 is held crosswise in the upper end of support 17 in notches 20 formed in the support and a coil spring 21 is anchored to the support 17 and connected to the pin 19 to hold the same in either a horizontal position, as shown in Figure 3 of the drawing, or in a vertical position in the upper end of support 17, as shown in Figure 4.

A thread or other suitable flexible member 22 extends downwardly in arm 13 and is provided with a loop or guide 23 at its upper end through which the thread 24 passes from the spool 18 to the fly 8. The thread 22 extends outwardly at the lower end of arm 13 and a weight 25 is attached thereto.

In the operation of the device, the weight 25 subjects the thread 22 to a downward pulling force, to thus hold the thread 24 under tension as the same is spooled off of the spool 18. Locking pin 19 is held against the top of spool 17 by spring 21 to provide a braking action for the spool opposed to the pulling force subjected to the thread by weight 25.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claim.

Having described the invention, what is claimed as new is:

A thread tensioning device for fly tying vises comprising in combination, a fly holding member, a tubular arm having a hollow upstanding forked upper end, a spool support on one of the forked ends adapted for rotatably supporting a spool of thread, a brake pin in said one forked end adapted for turning crosswise against the forked end to frictionally engage the hub of the spool, tensioning means internally of said one forked end for the brake pin, a guide in the other forked end of the tubular arm for the thread payed out from the spool, and gravity actuated means in the arm connected to the guide.

PERRY E. ALLEN.

References Cited in the file of this patent

UNITED STATES PATENTS

| Number | Name | Date |
|---|---|---|
| 67,519 | Fewkes | Aug. 6, 1867 |
| 1,344,400 | Houghton | June 22, 1920 |
| 2,040,705 | Olson et al. | May 12, 1936 |
| 2,332,655 | Miles | Oct. 26, 1943 |
| 2,373,513 | Stevenson | Apr. 10, 1945 |
| 2,486,142 | Fong | Oct. 25, 1949 |

FOREIGN PATENTS

| Number | Country | Date |
|---|---|---|
| 1,933 | Great Britain | July 3, 1867 |